United States Patent [19]
Shimotashiro et al.

[11] Patent Number: 5,587,848
[45] Date of Patent: Dec. 24, 1996

[54] DIGITAL SIGNAL MAGNETIC RECORDING AND REPRODUCING APPARATUS FOR BOTH METAL EVAPORATION TAPES AND METAL POWDER TAPES

[75] Inventors: Masafumi Shimotashiro; Akio Kuroe, both of Katano, Japan

[73] Assignee: Matsushita Electric Industrial Co., Ltd., Osaka, Japan

[21] Appl. No.: 423,727

[22] Filed: Apr. 18, 1995

[30] Foreign Application Priority Data

Apr. 18, 1994 [JP] Japan .................................. 6-078342

[51] Int. Cl.⁶ .................................................. G11B 5/09
[52] U.S. Cl. ................. 360/46; 360/61; 360/65; 360/69
[58] Field of Search ................... 360/46, 65, 61, 360/69

[56] References Cited

U.S. PATENT DOCUMENTS

| | | | |
|---|---|---|---|
| 4,613,912 | 9/1986 | Akira et al. | 360/27 |
| 5,182,693 | 1/1993 | Koga et al. | 360/135 |
| 5,311,373 | 5/1994 | Murabayashi et al. | 360/27 |

FOREIGN PATENT DOCUMENTS

| | | |
|---|---|---|
| 461880 | 12/1991 | European Pat. Off. . |
| 2023559 | 1/1990 | Japan . |
| 2278501 | 11/1990 | Japan . |
| 4103002 | 4/1992 | Japan . |

OTHER PUBLICATIONS

1993 IEEE International Magnetics Conference (Intermag '93), Stockholm, Sweden, 13–16 Apr. 1993, vol. 29, No. 6, Pt. 2, ISSN 0018–9464, IEEE Transactions on Magnetics, Nov. 1993, USA, pp. 3954–3956, "Investigation on Tape––Head Contact in VTR", Nov. 1993, Okuwaki et al.
Sanyo Technical Review, 1985, vol. 17, No. 2, pp. 21–44, "Develpment of 8mm Video System", Hiro et al.

*Primary Examiner*—W. C. Kim
*Attorney, Agent, or Firm*—Wenderoth, Lind & Ponack

[57] ABSTRACT

In a magnetic recording and reproducing apparatus, a recording current setting circuit sets a recording current to be larger by 1 dB or more than a recording current which maximizes a reproduced signal level in correspondence to the shortest recording wavelength in digital signals to be recorded. Recording is performed with a magnetic head onto a metal powder tape including a magnetic layer of thickness having a 0.2 μm or less. Thus, an overwrite characteristic can be obtained which are generally similar to that of a metal evaporation tape. Further, on reproduction, either an output from a equalizer circuit for a metal evaporation tape or an output from another equalizer circuit for a metal powder tape is selected by a switch circuit according to an output of a tape type detection circuit, and loop control gain of a tracking control circuit is changed according to the detected tape type. Thus, both metal powder tapes and metal evaporation tapes can be used.

5 Claims, 4 Drawing Sheets

DIGITAL SIGNAL MAGNETIC RECORDING AND REPRODUCING APPARATUS FOR BOTH METAL EVAPORATION TAPES AND METAL POWDER TAPES

BACKGROUND OF THE INVENTION

1. Field of the Invention

The present invention relates to a magnetic recording and reproducing apparatus for digital signals, such as a digital video cassette recorder for two types of magnetic recording media, metal evaporation tapes and metal powder tapes.

2. Description of the Prior Art

A digital audio tape system (DAT) is one of prior art recording and reproducing apparatuses for digital signals which uses only a recording head for overwrite recording, without using an eraser head (refer to The DAT Conference Standard Digital Audio Tape Recorder System; The DAT Conference, May 29, 1987).

DAT provides regions for recording pilot signals for detecting recording track position and data regions for recording information data. Further, it selects wavelengths of signals suitable for overwrite characteristic, or shortest and longest wavelengths of recording data patterns are set as described below so as to be suitable for overwrite characteristic. (For example, the longest wavelength is 2.66 μm and the shortest one is 0.67 μm in the data regions, while the longest wavelength is 24 μm and the shortest one is 2 μm in the regions for pilot signals.)

On the other hand, a new digital video cassette recorder standard for consumer use (referred to as DVD) was proposed in July 1993, and has been investigated in a HD Digital VCR Conference. (For example, T. Yamamitsu et al., Role of Storage in Multi-Media Age and High Density Recording Technology, Japan Applied Magnetism Society, 83th Meeting, 83-4, Jan. 25, 1994.)

DVC also assumes that signals are overwritten only with a recording head. Pilot signals for detecting recording tracks are generated by a digital modulation circuit with use of a data pattern, and they are superposed as a continuous signal over the whole track region. The shortest wavelength of information data is 0.49 μm, while the longest wavelength is 22.1 μm for data. Thus, DVC can overwrite signals at shorter and longer wavelengths than DAT. DVC uses only metal evaporation tapes suitable for overwrite characteristic.

SUMMARY OF THE INVENTION

An object of the present invention is to provide a magnetic recording apparatus for recording a metal powder tape similarly to a metal evaporation tape.

Another object of the present invention is to provide a magnetic recording apparatus which can record signals both to a metal powder tape and to a metal evaporation tape.

A still other object of the present invention is to provide a magnetic recording and reproducing apparatus which can record and reproduce signals both to and from a metal powder tape and to and from a metal evaporation tape.

In a first magnetic recording apparatus for digital signals for recording signals to a metal powder tape, the tape has a magnetic layer having a thickness approximately equal to a depth of recording when a shortest wavelength is recorded. A recording current setting circuit supplies a recording current value to a magnetic head according to input digital signals, where the recording current is large enough to perform overwrite without affecting servo control precision with said magnetic head. Thus, overwrite characteristic of a metal powder tape having a thickness of magnetic layer equal to or smaller than that of a metal evaporation tape can be compensated generally to that of a metal evaporation tape.

In another magnetic recording apparatus for recording signals to either a metal powder tape or to a metal evaporation tape, two equalizer circuits in correspondence to two types of tapes, metal evaporation tape and metal powder tape, are provided. Outputs of the two equalizer circuits can be selected by a switch circuit according to tape type detected by a tape type detection circuit. Then, detection errors can be minimized even if the two types of magnetic tapes are used.

In another different magnetic recording and reproducing apparatus for recording signals to either a metal powder tape or to a metal evaporation tape, a gain of a control loop of a tracking control circuit is changed according to tape type, metal evaporation tape or metal powder tape. Then, a position of the magnetic head can be controlled precisely to a recorded track position on reproduction even if either of the two types of tapes is used.

An advantage of the present invention is that overwrite characteristic of a metal powder tape is similar to that of a metal evaporation tape.

Another advantage of the present invention is that signals can be recorded both to a metal powder tape and to a metal evaporation tape.

A still other advantage the present invention is that signals can be recorded and reproduced both to and from a metal powder tape and to and from a metal evaporation tape.

BRIEF DESCRIPTION OF THE DRAWINGS

These and other objects and features of the present invention will become clear from the following description taken in conjunction with the preferred embodiments thereof with reference to the accompanying drawings, in which.

PREFERRED EMBODIMENTS OF THE INVENTION

Figure 1:
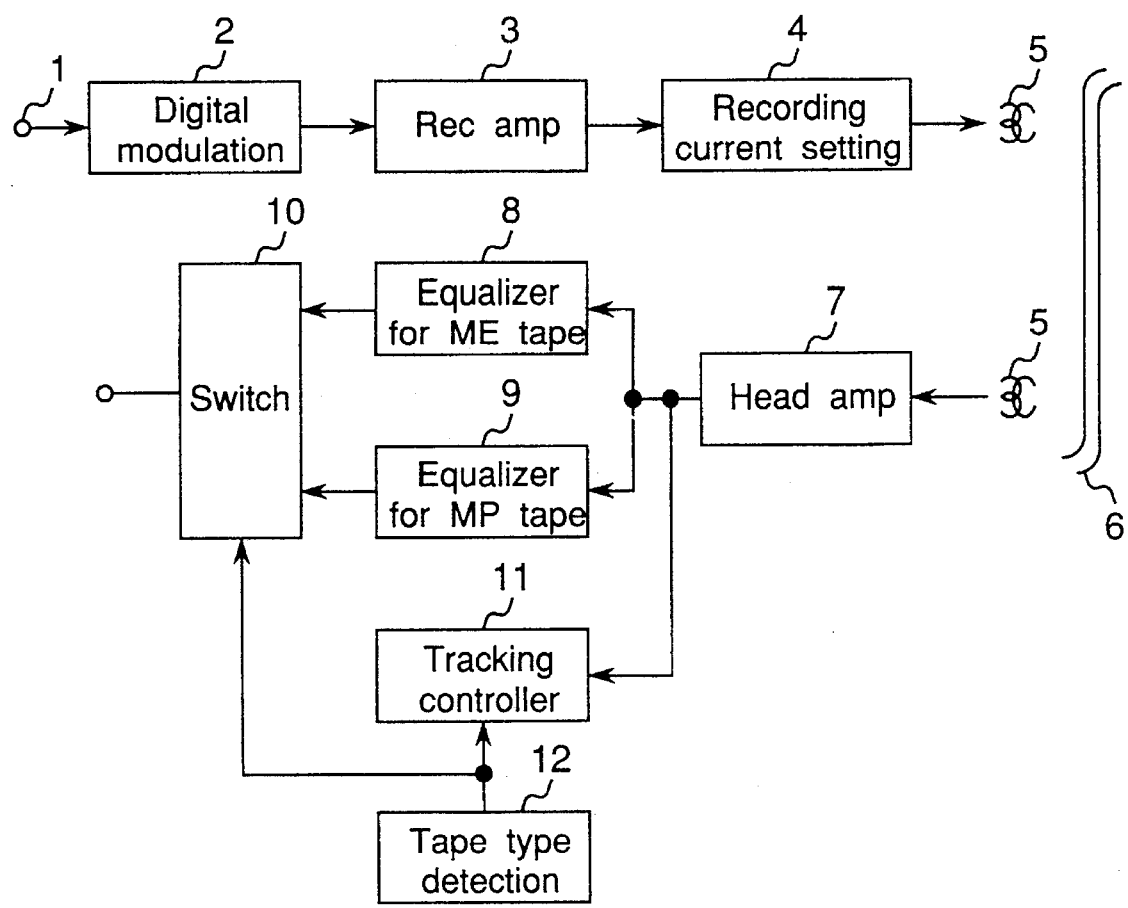
FIG. 1 is a block diagram for a magnetic recording and reproducing apparatus for digital signals of a first embodiment of the invention.
Figure 2:
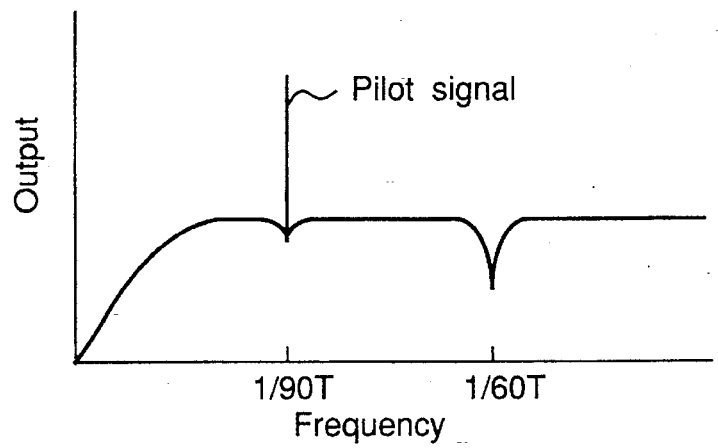
FIG. 2 is a graph of an example of frequency characteristic of outputs of a digital modulation circuit included in a magnetic recording and reproducing apparatus for digital signals of the first embodiment of the invention.

Embodiments of magnetic recording and reproducing apparatus according to the present invention will be explained with reference to the drawings, wherein FIG. 1 shows a main part of an electric circuit section of a magnetic recording and reproducing apparatus of an embodiment according to the invention. Digital signals coded from picture data, acoustic data, transmission data or the like are received through terminal 1. Next, a digital modulation circuit 2 adds pilot signals of low frequency for detecting recorded track position to the digital signals. DVC uses 24/25 coding for digital modulation to generate pilot signals as shown in FIG. 2 (frequency 1/90T and recording wavelength 22.1 μm) by using digital patterns, where T denotes a signal transmission period which is derived from a master clock signal of the apparatus. DVC uses pilot signals of a continuous signal of a longer wavelength than DAT because tracking is controlled according to recorded track positions precisely and stably.

Next, a recording amplifier 3 amplifies an output signal of the digital modulation circuit 2.

Then, a circuit 4 sets an output recording current in a range larger by 1 dB or more than a recording current value at which a reproduced signal level becomes maximum at a frequency in correspondence to the shortest recording wavelength of digital signals to be recorded, and the output signal of the circuit 4 or recording current is supplied to a coil wound in the magnetic head 5 to record signals to a metal powder tape or a metal evaporation tape 6 which is loaded in a cassette (not shown). Though a cassette loading system is not shown, the tape 6 is guided around a rotating cylinder and a pair of the magnetic heads 5 mounted to the cylinder scan the tape alternately. This is a known mechanism, and it is not explained here in detail.

Figure 3:
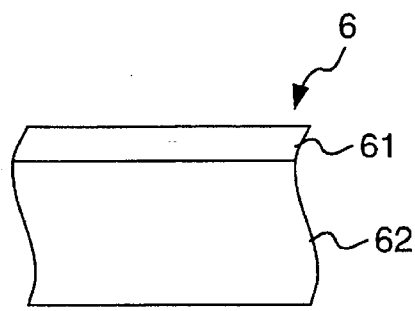
FIG. 3 is a sectional view of a magnetic tape.
Figure 4:
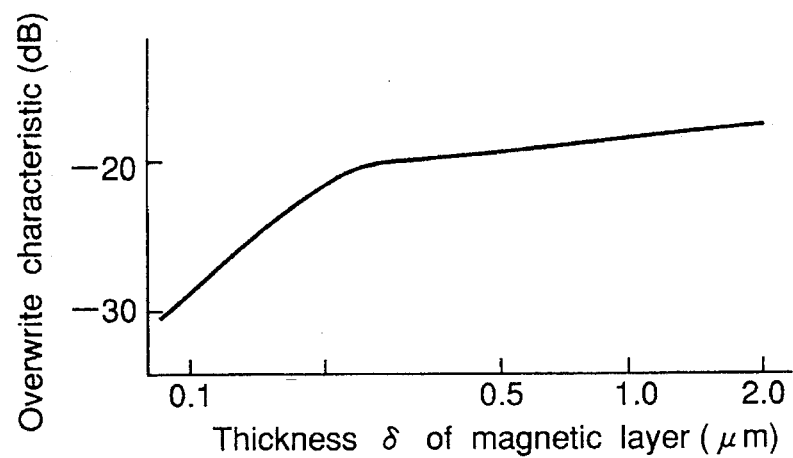
FIG. 4 is a graph of an example of an overwrite characteristic plotted against a thickness of magnetic layer for a metal powder tape.

Next, the magnetic tape 6 is explained. As shown in FIG. 3, the magnetic tape 6 consists of a base 62 and a magnetic layer 61 formed on the base, 62, and a thickness of the magnetic layer 61 for evaporation tapes used for DVC is about 0.2 μm. FIG. 4 shows an example of an overwrite characteristic plotted against thickness δ of a magnetic layer of a metal powder tape at the long recording wavelength 22.1 μm after signals at 22.1 μm in DVC are recorded and signals at the shortest wavelength 0.49 μm is overwritten further. It is found that the overwrite characteristic can be improved rapidly in a small region of thickness around 0.2 μm similar to that of a metal evaporation tape. A recording region in a magnetic tape is determined according to wavelength, and a recording depth is proportional to ¼ of wavelength λ. Therefore, by taking the shortest wavelength (or 0.49 μm for DVC) into account, if the thickness of the magnetic layer is set to be 0.2 μm or less, the entire thickness of magnetic layer can be recorded at the shortest wavelength, and the overwrite characteristic is improved at longer wavelengths. Thus, the metal powder tape 6 has a thickness of its magnetic layer 61 of 0.2 μm or less. In other words, the thickness of the magnetic layer 61 is selected to have about equal to or less than a recording depth when a signal at the shortest wavelength is recorded.

Thus, if a metal powder tape has a thickness of a magnetic layer of 0.2 μm or less, overwrite characteristic can be improved even for the metal powder tape. However, it is difficult to improve the overwrite characteristic up to that of a metal evaporation tape. Thus, overwrite characteristic is insufficient for the metal powder tape to be used for DVC.

Figure 5:
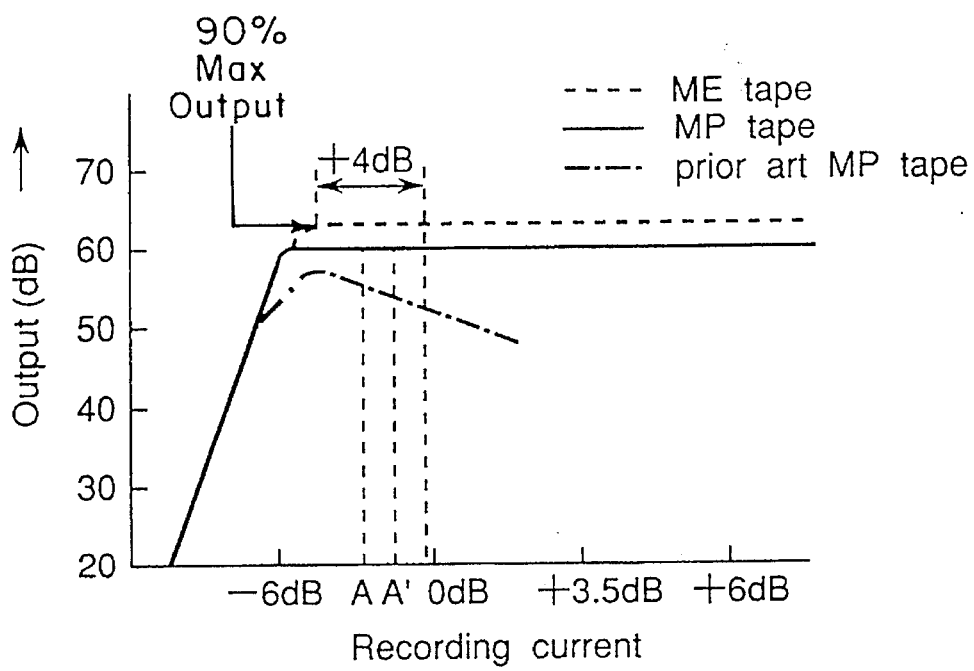
FIG. 5 is a graph of an example of a characteristic recording current for metal evaporation tape and for metal powder tape plotted against an output.

Next, it is explained how the recording current to be set by the recording current setting circuit 4 is determined. FIG. 5 shows an example of output signals of three tapes plotted against recording current where an output signal at the shortest wavelength 0.49 μm is measured as in DVC. For a prior art metal powder tape (having a thickness of magnetic layer of about 2 μm), the output signal (a dash and dot line) increases with increasing recording current and has a peak at a particular value of recording current. Then, it decreases due to demagnetization as the recording current is increased further over the particular value. On the contrary, the output signal for a metal powder tape having a thickness of the magnetic layer of 0.2 μm or less (solid line) becomes constant practically above a particular recording current, or even if recording current increases, demagnetization occurs little and the output decreases only about a few tenths dB relatively to the peak value. Therefore, it is to be noted that the recording current can be set freely in a relatively wide range for the metal powder tape. On the other hand, the output signal for a reference metal evaporation tape in DVC (dashed line) has similar output characteristic to, but has a larger value than the metal powder tape having a thickness of the magnetic layer of 0.2 μm or less.

Figure 6:
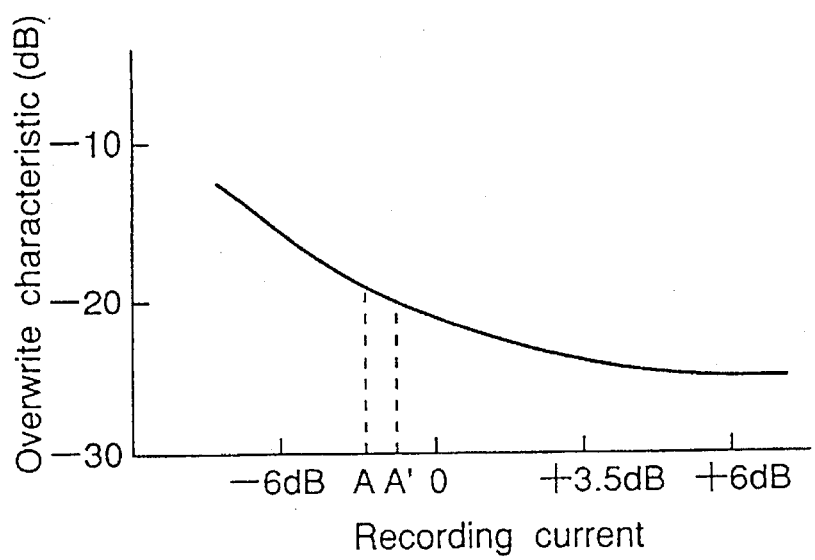
FIG. 6 is a graph of an example of an overwrite characteristic plotted against a recording current for a metal powder tape.

FIG. 6 shows an example of an overwrite characteristic plotted against recording current for a metal powder tape at the long recording wavelength 22.1 μm after signals at 22.1 μm in DVC are recorded and signals at the shortest wavelength 0.49 μm is overwritten further. It is found that the overwrite characteristic is improved with increasing recording current. The overwrite characteristic necessary to a magnetic recording and reproducing apparatus for digital signals is smaller than −20 dB for, for example, in the case of DVC. Therefore, for DVC, if the overwrite characteristic is −20 dB or higher, pilot signals at the low frequency for indicating recorded track positions cannot be erased completely, so that the track positions cannot be controlled precisely enough to be used practically. In FIG. 6, a point A denotes a recording current value for a metal powder tape at which the reproduced signal level at a frequency in correspondence to the recording wavelength becomes maximum. In the embodiment, the recording current is set at a value (point A') which is larger by 1 dB or more than the value at the point A, so that no problem occurs for a practical use. The value of 1 dB is selected to set a recording current value with which overwrite is performed without affecting precision of servo control. The recording current setting circuit 4 (FIG. 1) sets a value of recording current in a range where the recording current is larger by 1 dB or more than the value at the point A of recording current, so that the desired overwrite characteristic can be obtained.

Further, in FIG. 5, the recording current value in correspondence to DVC, or a recording current value for 90% of the maximum current for the reference metal evaporation tape plus 4 dB is described as 0 dB. As shown in FIG. 5, the recording current value in correspondence to DVC for metal evaporation tape explained above agrees to that for the above-mentioned setting condition of recording current for metal powder tape. Therefore, the recording current can be set to have the same value for a metal evaporation tape and for a metal powder tape.

Figure 7:
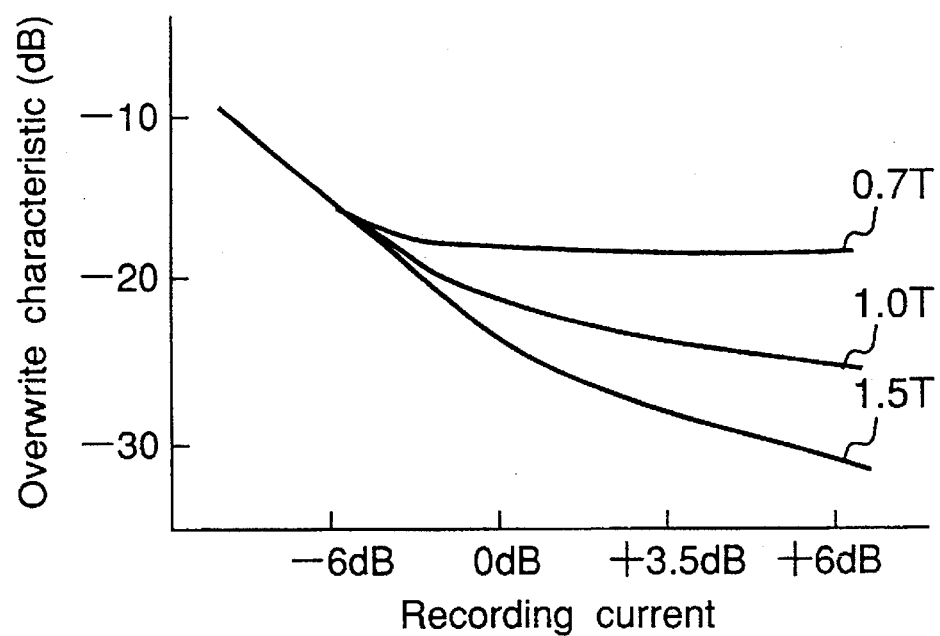
FIG. 7 is a graph of an example of an overwrite characteristic plotted against recording current for a metal powder tape for various magnetic head conditions.
Figure 8:
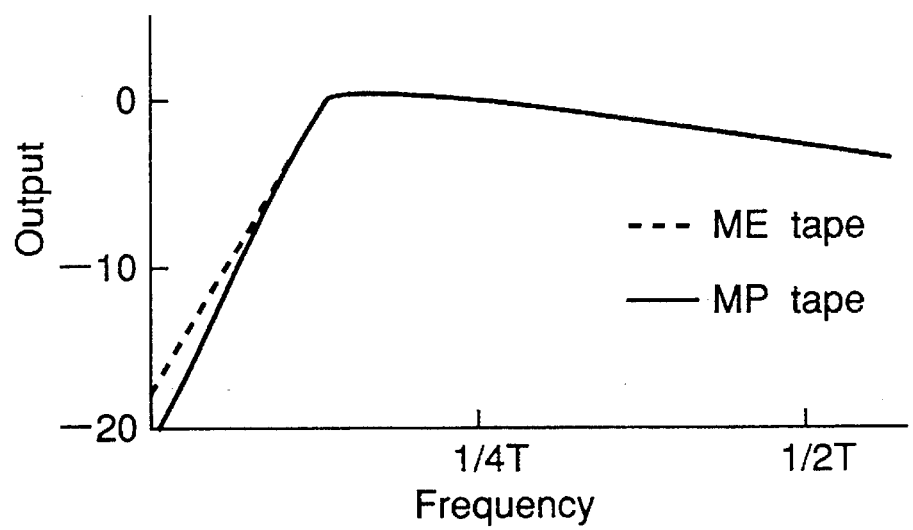
FIG. 8 is a graph of an example of frequency characteristic for metal evaporation tape and for metal powder tape.

Next, the magnetic head 5 is explained according to overwrite characteristic shown in FIG. 7. The magnetic head 5 is a metal-in-gap head, and planes made of a magnetic material opposes to form a head gap. FIG. 7 shows overwrite characteristic plotted against recording current when the saturation flux density (BS) of the magnetic material around the head gap of the magnetic head 5. Because DVC reproduces signals having the shortest wavelength of 0.49 μm, the magnetic head 5 is set to have the gap length GL of 0.25 μm or less in order to compensate recording. The gap length is 0.25 μm for the data shown in FIG. 7. Further, because DVC reproduces signals having the shortest wavelength of 0.49

μm, it uses a metal powder tape having coercive force of 2,000 Oe or higher. Therefore, FIG. 7 shows that if the saturation flux density of magnetic material around the head gap of the magnetic head 5 (FIG. 1) is not 1.0 T or higher, the magnetic flux density from the magnetic head 5 does not become stronger, and the overwrite characteristic cannot be improved. Therefore, it is necessary that the saturation flux density of magnetic material around the gap of the magnetic head 5 is 1.0 T or higher.

As explained above, the magnetic recording and reproducing apparatus of the embodiment can improve overwrite characteristic for a metal powder tape with a magnetic layer having a thickness of 0.2 μm or smaller by setting a recording current at a value than the most suitable recording current value, so that an overwrite characteristic similar to that for evaporation tape can be obtained.

In the recording system shown in FIG. 1, the signal amplified by the recording amplifier 3 is supplied to the recording current setting circuit 4. However, it is also possible that an output signal of the digital modulation circuit 2 is supplied to a recording current setting circuit 4, and the output signal of the circuit 4 is supplied to a recording amplifier to supply recording current to the magnetic head 5.

Next, a reproduction system shown in FIG. 1 is explained. Digital signals recorded in a metal evaporation or powder tape 6 detected with the magnetic head 5 is transmitted to a head amplifier 7, which amplifies the reproduced digital signals. Here, the output signal of the head amplifier 7 at low frequencies changes in proportion to the thickness δ of magnetic layer 5, and the output at low frequencies changes in proportion to thickness δ. Further, if a thickness of magnetic layer of a magnetic powder tape is set to be 0.2 μm or less in order to improve overwrite characteristic as much as possible, a problem occurs that output signals at low frequencies decrease. That is, if the thickness δ has the same value between a metal evaporation tape and a metal powder tape, the output signal is always larger for the metal evaporation tape, as shown in the frequency characteristic in FIG. 7 where T denotes signal transmission period. Because the output signal at low frequencies is proportional to a quantity of magnetic recording medium per unit area, even if the thickness δ of the magnetic layer 5 has the same value, the output signal of a metal powder tape is always smaller than that of a metal evaporation tape because the metal powder tape includes binders, polishing materials or the like in the magnetic layer. Therefore, the output signal of the head amplifier 7 is input to an equalizer circuit 8 for metal evaporation tape and to another equalizer circuit 9 for metal powder tape for correcting frequency characteristic, so as to optimize equalizing characteristic for each tape type.

Next, a switch circuit 10 selects one of the output signals of the equalizing circuits 8 and 9 according to an output signal on tape type from a tape type detection circuit 12. Therefore, after the switch circuit 10, errors in data detection can be minimized irrespective of the type of tape, metal evaporation tape and metal powder tape. The tape type detection circuit 12 can detects holes provided to a tape cassette mechanically to discriminate a tape type, or it stores information for discriminating the tape types in a memory device and detects the information electronically to discriminate them.

In the embodiment, the pilot signals of low frequency have been added by the digital modulation circuit 2 for recognizing track positions as shown in FIG. 2. Therefore, the head amplifier 7 also reproduces the pilot signals of low frequency, and a tracking control circuit 11 detects a difference in the pilot signals from adjacent tracks at the two sides to control recorded tracking positions. As mentioned above, output signals are different at low frequencies between metal evaporation tape and metal powder tape having a thickness of magnetic layer of 0.2 μm or less. Then, an amplitude of reproduced pilot signal is different between metal evaporation tape and metal powder tape. Then, it becomes difficult to control the head position precisely. In order to solve this problem, the tracking control circuit 11 switches a gain of control loop according to the tape type detected by the tape type detection circuit 12. Thus, error rate and tracking control can be optimized for the two types of tapes, and servo control precision of the circuit 12 can be stabilized.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recording apparatus for digital signals, said apparatus comprising:

a metal powder tape having a magnetic layer, said magnetic layer having a thickness of 0.2 μm or less and a coercive force of 2,000 Oe or more;

a magnetic head for recording signals onto said metal powder tape; and a recording current setting circuit for supplying a recording current to said magnetic head according to input digital signals, a value of the recording current being 4 dB higher than that necessary to obtain 90% of a maximum output level at a shortest wavelength to be recorded for a reference metal evaporation tape of a predetermined digital video cassette recording consumer use standard.

2. The apparatus according to claim 1, wherein said recording current setting circuit includes an amplifier for amplifying the input digital signals.

3. The apparatus according to claim 1, further comprising a modulation circuit which adds pilot signals of low frequency for detecting recording tracks to the input digital signals to be supplied to said recording current setting circuit.

4. The apparatus according to claim 1, wherein said magnetic head is a metal-in-gap head having a gap length of 0.25 μm or narrower, and a magnetic material provided at a head gap of said magnetic head has a saturation flux density of 1 T or higher.

5. A magnetic recording and reproducing apparatus for digital signals, said apparatus comprising:

a magnetic tape having a magnetic layer, said magnetic tape being either one of a metal evaporation tape and a metal powder tape, said magnetic layer having a thickness of 0.2 μm or less and a coercive force of 2,000 Oe or more;

a magnetic head for recording signals onto said magnetic tape; and a recording current setting circuit for supplying a recording current to said magnetic head according to input digital signals, a value of the recording current being 4 dB higher than that necessary to obtain 90% of a maximum output level at a shortest wavelength to be recorded for a reference metal evaporation tape of a predetermined digital video cassette recording consumer use standard, wherein said recording current setting circuit sets the same value of the recording current for both the metal evaporation tape and the metal powder tape;

a tape type detection circuit for detecting whether said magnetic tape is the metal evaporation tape or the metal powder tape;

a head amplifier for amplifying signals reproduced with said magnetic head from the magnetic tape to a prescribed level;

a first equalizer circuit for the metal evaporation tape and a second equalizer circuit for the metal powder tape for correcting a frequency characteristic of output signals of said head amplifier; and a switch circuit for switching output signals from said first equalizer circuit or said second equalizer circuit according to a type of magnetic tape detected by said tape type detection circuit.

\* \* \* \* \*